(12) United States Patent
Bolde

(10) Patent No.: US 6,811,072 B2
(45) Date of Patent: Nov. 2, 2004

(54) KNOWN GOOD DIE REMOVAL METHOD AND APPARATUS

(75) Inventor: Lannie R. Bolde, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 09/756,832

(22) Filed: Jan. 9, 2001

(65) Prior Publication Data

US 2002/0088846 A1 Jul. 11, 2002

(51) Int. Cl.⁷ .................... B23K 0/018; B23K 28/00; B23K 31/02
(52) U.S. Cl. .................. 228/191; 228/119; 228/264; 228/19
(58) Field of Search ................ 228/264, 103, 228/119, 191, 13, 19

(56) References Cited

U.S. PATENT DOCUMENTS

| | | | |
|---|---|---|---|
| 4,979,287 A | 12/1990 | Schwab et al. | 29/764 |
| 5,553,766 A | 9/1996 | Jackson et al. | 228/13 |
| 5,556,024 A | 9/1996 | Olson et al. | 228/264 |
| 5,636,781 A | 6/1997 | Olson et al. | 228/19 |
| 5,707,000 A | 1/1998 | Olson et al. | 228/264 |
| 5,738,267 A | 4/1998 | Olson et al. | 228/13 |
| 5,779,133 A | 7/1998 | Jackson et al. | 228/13 |
| 5,782,403 A | 7/1998 | Wang | 228/264 |
| 5,836,071 A * | 11/1998 | Falcone et al. | 29/593 |
| 6,005,292 A * | 12/1999 | Roldan et al. | 257/690 |
| 6,163,014 A * | 12/2000 | Bergeron et al. | 219/388 |
| 6,300,782 B1 * | 10/2001 | Hembree et al. | 29/874 |
| 6,313,651 B1 * | 11/2001 | Hembree et al. | 324/755 |
| 6,320,163 B2 * | 11/2001 | Bergeron et al. | 219/388 |
| 6,333,491 B1 * | 12/2001 | Bergeron et al. | 219/388 |

\* cited by examiner

*Primary Examiner*—Steven Bos
*Assistant Examiner*—Colleen P. Cooke
(74) *Attorney, Agent, or Firm*—Ira D. Blecker

(57) ABSTRACT

A method and apparatus for separating a chip from substrate where the chip is attached to the substrate by solder connections to form an assembly involve applying a loading force to drive a coil spring biased shearing element comprising a slide block with carrying a shearing blade into a loading position. Load the assembly of the substrate and the chip into a fixture with a window therethrough for the chip with the shearing blade in contact with the chip. Remove the loading force to arm the shearing blade to apply a shearing force from the shearing blade to the chip. Heat the solder connections of the assembly in the fixture to a predetermined temperature, preferably below the melting temperature of the solder at which shearing of the solder connections occurs. The shearing blade comprises a slidable plastic blade backed up by a metal blade. The shearing blades are affixed to a the slide block that is connected by a linkage to a coil spring which applies the biasing force thereto and which provides a nest for catching a chip which has been sheared away from a substrate.

32 Claims, 9 Drawing Sheets

KNOWN GOOD DIE REMOVAL METHOD AND APPARATUS

BACKGROUND OF THE INVENTION

1. Field of the Invention

This invention pertains to a method and an apparatus for removing soldered electronic components from a substrate. More particularly, it relates to non-destructive, low stress removal of chips temporarily soldered to a substrate during Known-Good-Die (KGD) testing an processing of flip chip devices.

2. Description of Related Art

As the state of the art advances, devices formed on semiconductor chips become smaller in dimensions and the devices become more densely crowded on the chip. As a result there is an increasingly important need to pretest devices as a quality control measure involving identification and elimination of defective chips before use thereof. To facilitate pretesting, a technology has developed which is commonly referred to as the KGD (Known Good Die) practice in which a chip is bonded to a temporary substrate in a temporary chip attachment (TCA) process wherein, during a testing interval, the chip is mounted temporarily to a chip carrier substrate which has electrical contacts which match contacts on the chip. During the testing interval, the chip is electrically tested through the substrate. After completion of testing, the chip is removed from the substrate for future use. During the testing interval, a burn-in process is used in which the chip to be tested is bonded temporarily to the substrate. It is desirable for the bonds between the substrate and the chip to be mechanically weak, but strong enough to hold the semiconductor chip in place and to maintain good electrical connections during testing. The chip is normally positioned on the substrate so that the electrical contacts, e.g. C4 solder balls (hereinafter referred to as C4's) on the chip are aligned with the corresponding contacts on the substrate so that the C4's make electrical connections between the chip and the substrate.

In one process for the testing of KGD flip chip devices, silicon chips are temporarily attached by solder balls (typically a SnPb alloy, such as 3% tin (Sn) and 97% lead (Pb), referred to as 3/97 solder) to a composite or ceramic substrate (chip carrier) and subjected to electronic component testing and burn-in. Following this testing, the chips are mounted in a first fixture and subjected at ambient temperature to shear forces across the solder balls to remove the chip from the substrate. These forces typically fracture the solder balls, leaving some solder attached to the substrate and the remainder of the solder attached to the chip. Thereafter, the chips are removed from the first fixture, and those which tested as good are then mounted in a second fixture for heat processing to liquefy the solder on the chip and reform the solder balls. The resulting chips are then packaged and eventually mounted in an array of chips on another substrate.

A variety of processes and techniques have been devised and described in the art to form a temporary connection between semiconductor chips and substrates, so as to be able to readily separate the chip and the substrate after burn-in tests have been conducted. Several of these are described in U.S. Pat. No. 5,556,024 of Olson et al., commonly assigned for "Apparatus and Method for Removing Known Good Die Using Hot Shear Process" and the teachings thereof are incorporated herein by reference. In the process of the Olson et al. patent, the substrate which is referred to as device carrier and the device are placed in a fixture, heated to the solder liquidus temperature, and the device is then pulled away from the substrate. In one embodiment, after being heated to the solder liquidus temperature, shear forces are applied sufficient to overcome solder surface tension and to separate the die and carrier. Related patents of Olson et al. include U.S. Pat. Nos. 5,707,000; 5,636,781; 5,738,267.

U.S. patent application (CA9-98-056) Ser. No. 09/460,279, filed Dec. 13, 1999, of Bergeron et al for "Apparatus and Method for Non-Destructive, Low Stress Removal of Soldered Electronic Components" describes an apparatus and a method for removing circuit chips from an assembly including a one or more circuit chips attached to at least one chip carrier, or substrate. The chips are subjected to static shear with respect to the substrate, and heated to a temperature facilitating shear within a temperature range at which solder connections are solid, such that the chip is sheared off with respect to the substrate at the plane of attachment of the solder to the substrate. In addition, the chips are further heated following disassembly to a temperature at which the solder is liquid to facilitate reforming the solder for subsequent attachment of the chip into an electronic device. In addition the substrate is held within a top plate and the circuit chips are positioned within successive chip cavities within a bottom plate. Each chip cavity includes a load surface separated by a cascade effect pitch with respect to adjacent chip cavities. A cascade effect shear force is sequentially applied to the circuit chips to remove them from the substrate seriatim.

The substrate has reduced pad dimensions, which releases the C4's therefrom, thereby permitting the C4's to remain on the newly tested chips during the removal process so that the chips can be reattached to the final substrate in the product for which they were manufactured. In addition, the removal process is conducted at pre-reflow temperatures, i.e. below reflow temperatures. A linear shearing force is applied to the first substrate carrier by way of a single compression coil spring. This action pushes the substrate forward and forces the chip to press against a shear tab thus pre-loading the C4's on the first chip with a known shear force. The shear force being applied is set to shear the chip when it has been heated to an elevated temperature. Therefore, at room temperature the chip remains connected to the substrate. When the loaded fixture is placed into a furnace and heated to a critical temperature, the C4 joints and the chip are sheared away from the substrate. The heating raises the temperature until it softens the C4 solder balls on all the parts until they allow the shearing force to push the first carrier forward thus shearing the first chip away from the carrier. As this carrier is moved forward by the coil spring, the first substrate makes contact to the second substrate and the remaining coil spring force is applied to the chip on the second carrier. This action continues until all chips on all carriers are sheared seriatim. With the Bergeron et al. process, the is a variation in coil spring force as the coil spring moves the first substrate forward using the Bergeron et al. process, the coil spring force rate changes. Therefore, forces applied to each chip are different. In addition, the first chip in the row is the only chip that receives the maximum shear force at room temperature which results in an inconsistent application of force.

SUMMARY OF THE INVENTION

The present invention is concerned with a cost effective device and pre-load mechanism for removing known good dies from substrate carriers. The primary advantages over existing fixtures is tooling cost, flexibility and process improvement.

An object of this invention is to provide apparatus for performing the chip removal from a substrate without a high tooling cost for machining during fabrication.

Another object of this invention is to provide such a tool while at the same time avoiding any high costs associated with adapting the tool to operate with product variations.

A very important object of this invention is to provide process consistency with uniform shear forces applied to each chip at room temperature.

The invention includes a coil spring load mechanism—for each carrier/chip assembly thereby allowing each shear force for each chip to be set independently.

The invention also includes a coil spring compression device which compresses the shear coil spring, positions the shearing blade to the load position and displays the force to the operator.

With this design, shear forces on each chip are monitored during the fixture load operation and the shear process for each chip is the same.

In accordance with this invention a method and apparatus are provided for separating a an assembly comprising a substrate and semiconductor device, e.g. a semiconductor chip. For example, the semiconductor device is attached to the substrate by solder connections. The assembly is to be placed into a fixture which includes a biased shearing element. First a loading force is applied which drives a biasing element such as a coil spring and the biased shearing element into a loading position for loading, i.e. placing, the assembly into the fixture. Then load/place the assembly of the substrate and the semiconductor device into a fixture. Preferably, the fixture has a window therethrough providing space for the semiconductor device. During loading the shearing element is held proximate to the semiconductor device but out of contact with therewith. Remove the loading force to permit the shearing element to contact the semiconductor device and to apply a shearing force from the shearing element to the semiconductor device. Then, upon heating the solder connections of the assembly in the fixture to a predetermined temperature, the force applied by the shearing element is sufficient to separate the semiconductor device from the substrate. Preferably the temperature is below the melting temperature of the solder at which shearing of the solder connections occurs; and the shearing element comprises a slidable blade. Alternatively, the shearing element is a blade affixed to a slidable element that is connected by a linkage to a coil spring which applies the biasing force thereto.

In accordance with another aspect of this invention removal of a circuit chip from a substrate in a fixture having a shearing element, where the chip is secured to a substrate by bonding elements is provided by applying a loading force to move a shearing element from a mechanically biased home position into an armed, loading position, preferably under a top portion of the fixture, against a biasing force proximate to a position into which the chip is to be loaded. Then load the substrate with the chip onto the fixture. Then remove the loading force to permit the armed shearing element to move to a position in which it contacts the chip and thereby applies a mechanical shearing force to the chip in response to the biasing force applied to the shearing element by the mechanical bias. Then, heat the assembly located in the fixture to a predetermined temperature, e.g. a temperature below the melting temperature of the bonding elements, until shearing of the bonding elements occurs while continuously applying the mechanical shearing force with the shearing element.

Preferably the shearing element is a blade affixed to a slidable element that is connected by a linkage to a coil spring that applies the biasing force thereto; and/or the shearing element is a blade affixed to a slidable block which is connected by a screw that is biased to a home position by a coil spring which applies the biasing force thereto.

Preferably, the shearing element is a blade affixed to a slidable block which is connected by a screw that is biased to a home position by a coil spring which applies the biasing force thereto, and an adjustable element is provided for adjusting the bias applied by the coil spring. The bonding elements comprise solder balls or the like. The solder is heated to a temperature which facilitates the shearing of the C4 joints and removal of the chips from the substrate while the solder is in a solid state.

Preferably, each substrate and the associated chip are loaded into a seat in an upper element with the chip extending through an open window through the seat. The shearing element is connected to a slide element which is connected by a screw that is biased to a home position by a coil spring which applies the biasing force thereto, and an adjustable element is provided for adjusting the biasing force applied by the coil spring. Preferably, the slide element includes a nest located below the window adapted and located for catching a chip sheared from a substrate.

BRIEF DESCRIPTION OF THE DRAWINGS

The foregoing and other aspects and advantages of this invention are explained and described below with reference to the accompanying drawings, in which:

FIG. 3A shows an enlarged portion of FIG. 2 showing the fixture with slide block in the home position.

FIG. 3B shows the view of FIG. 3A with the slide block and the shearing blade moved to the left with the substrate and the chip loaded onto the fixture.

FIG. 3C shows the view of FIG. 3B with the slide block and the attached shearing blade having moved to the right until the shearing blade is in contact with the chip; and with the shearing blade armed by a linear force from a coil spring which pulls the shearing blade to the right creating a shearing force which tends to shear the C4's and the chip away from the substrate.

FIG. 3D shows the view of FIG. 3C with the chip and the C4's separated from the substrate resting in a nest on the top surface of the slide block and with the shearing blade and the slide block moved back to the home position.

DESCRIPTION OF THE PREFERRED EMBODIMENT

Figure 1A:
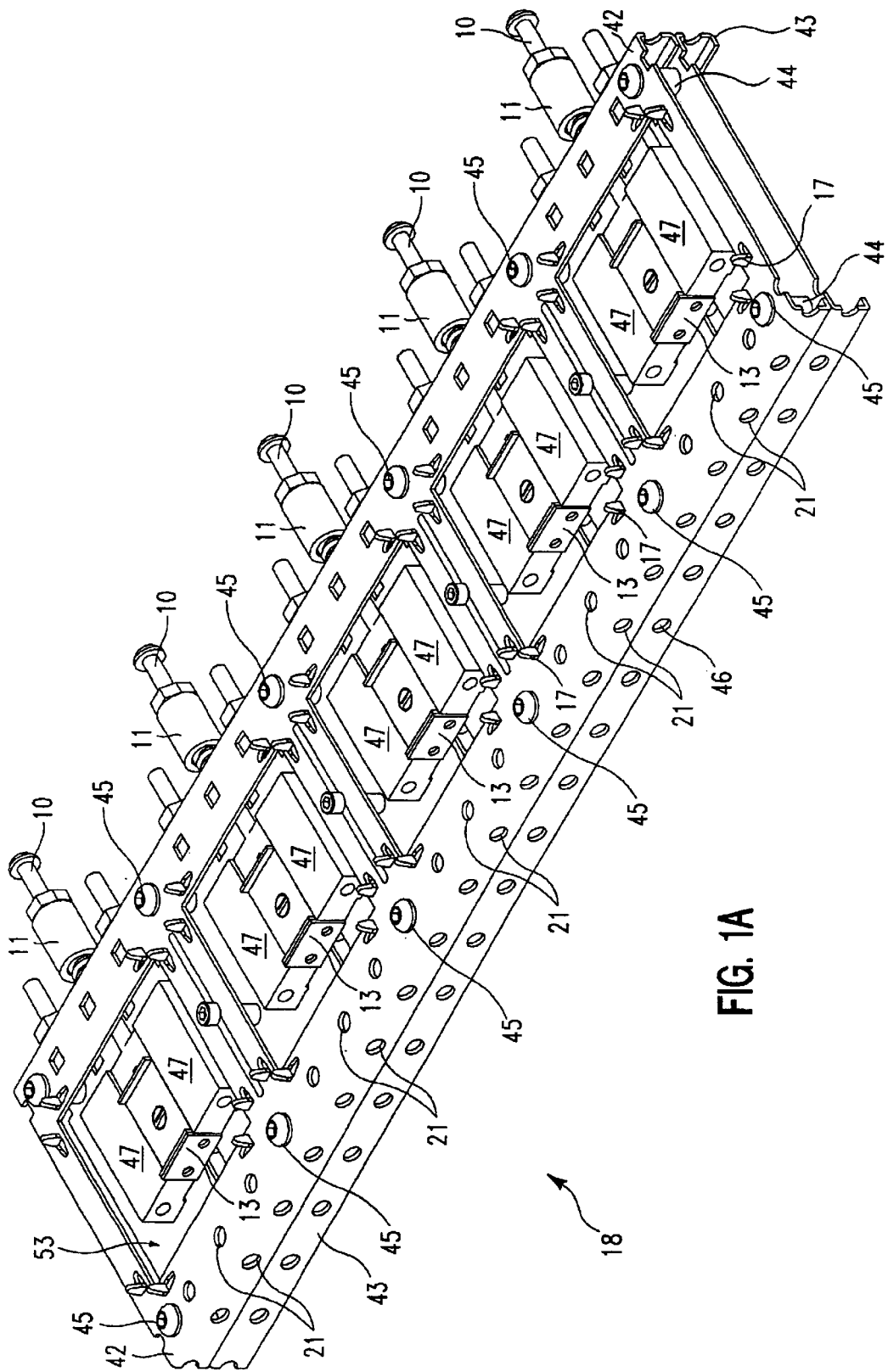
FIG. 1A is a perspective view of an assembly including an upper, framing boat and a lower support boat which performs the shearing operation in accordance with this invention.
Figure 1B:
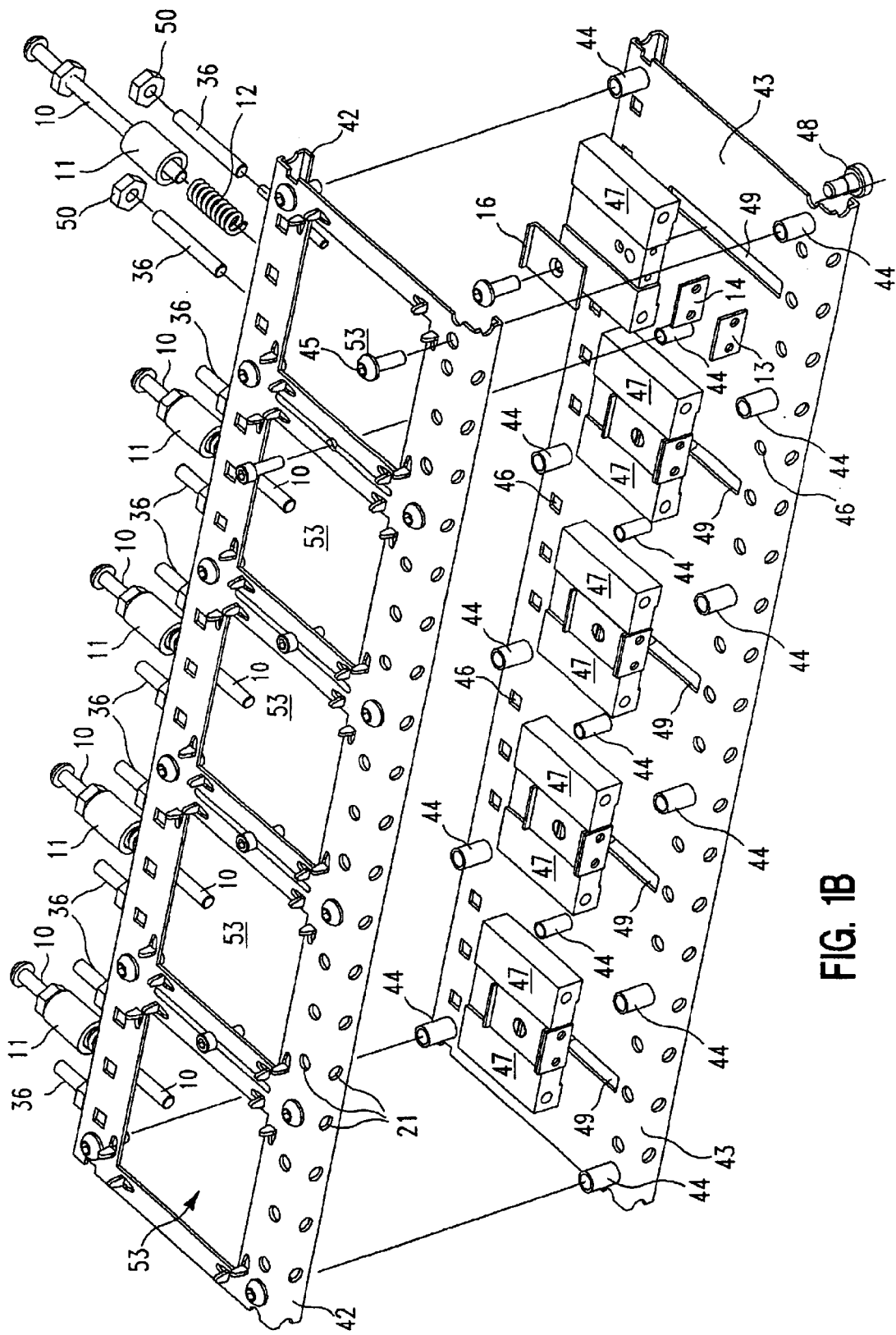
FIG. 1B is an exploded view of the assembly of FIG. 1A showing the two boats and additional elements.
Figure 1C:
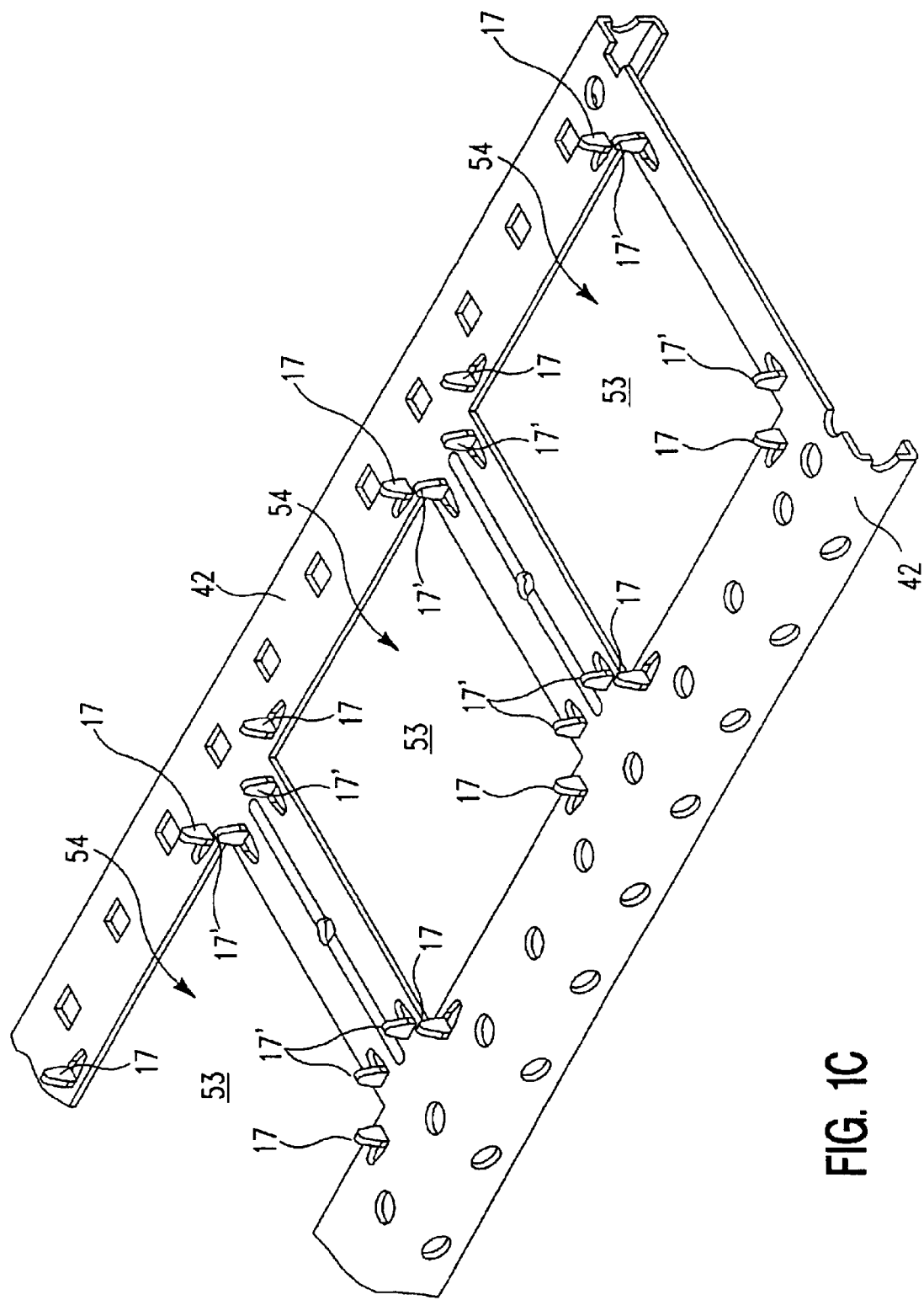
FIG. 1C is an enlarged perspective view of a portion of FIG. 1B showing the showing the seat on the top surface thereof with a window in the center of the seat for a substrate inserted into the seat and a chip extending below the window as seen in FIG. 2.
Figure 1D:
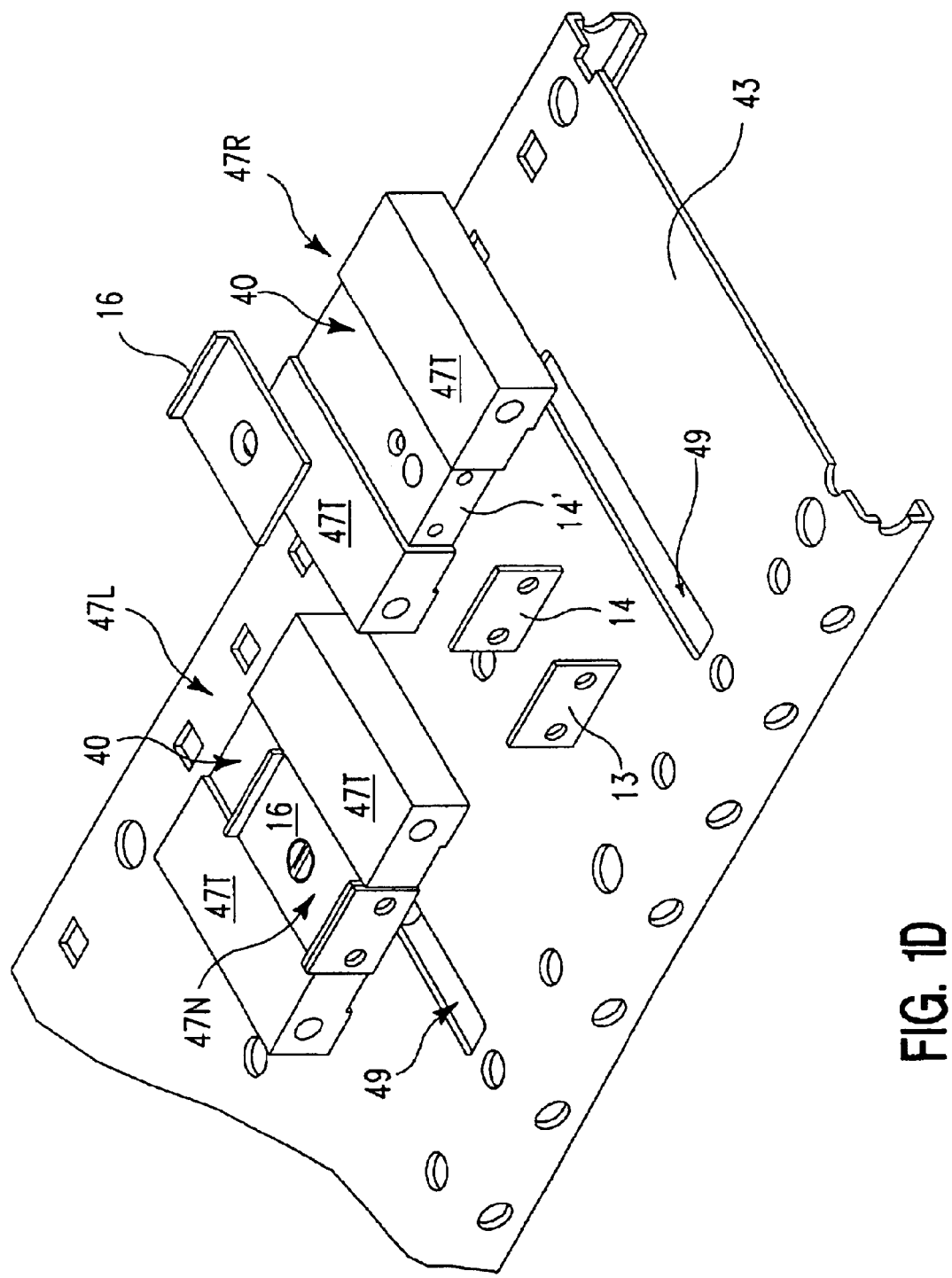
FIG. 1D is an enlarged perspective view of a portion of FIG. 1B showing a perspective view of a pair of slide blocks (with both assembled and exploded views) on the lower boat.
Figure 2:
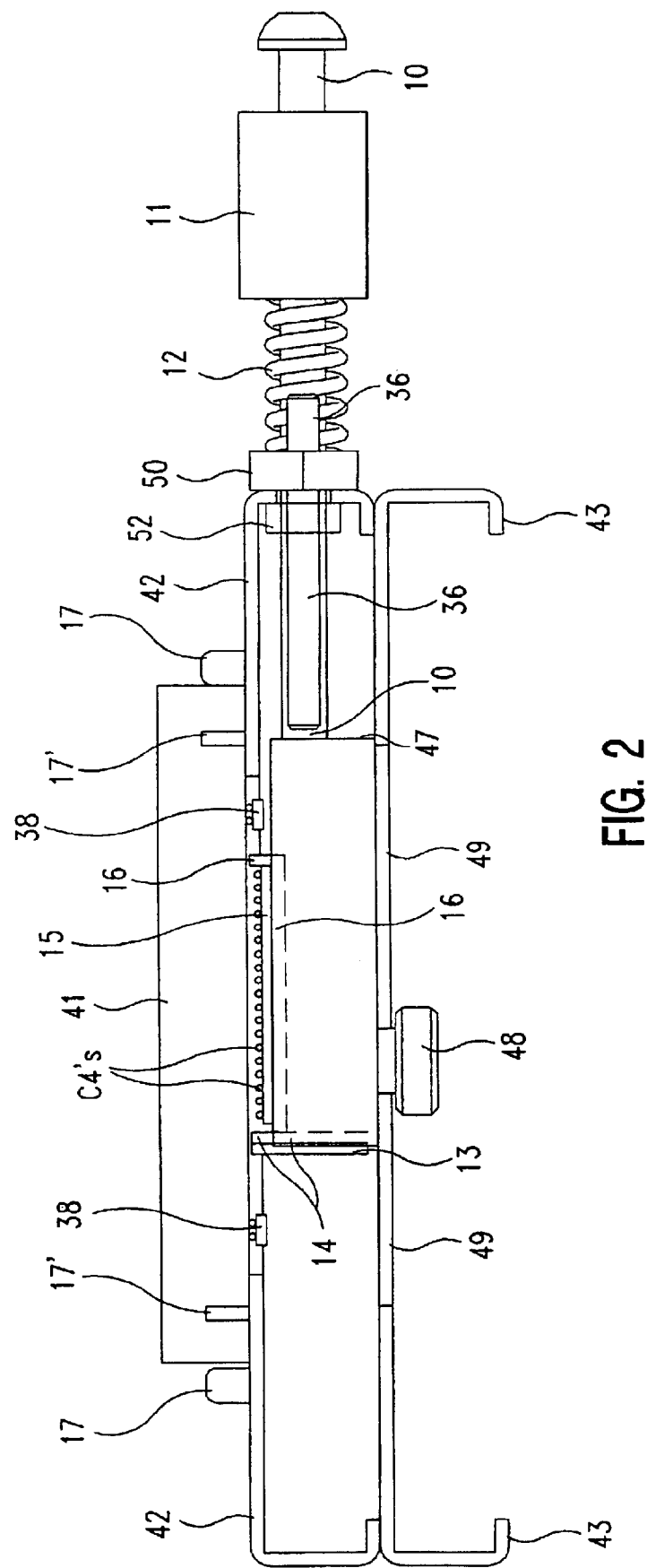
FIG. 2 which is an enlarged right side view of the assembly of FIG. 1A.

FIG. 1A shows a perspective view of the boat assembly 18 in accordance with this invention. FIG. 1B is an exploded view of the boat assembly 18 of FIG. 1A. FIG. 2 which is an enlarged right side view of the boat assembly 18 of FIG. 1A. As can be seen in FIG. 1B, the boat assembly 18 is formed by two boats 42/43 and other elements. The boat assembly 18 includes an upper, framing boat 42 and a lower support boat 43. The boats 42/43 are formed from boats originally manufactured by Auer to be used for article handling in the semiconductor manufacturing environment. FIG. 1C is an enlarged perspective view of a portion of FIG. 1B showing the seat 54 on the top surface of the upper boat 42 with a window 53 in the center of the seat 54 for a substrate 41 to be inserted into the seat 54 with a chip 15 extending below the window 53 as seen in FIG. 2. FIG. 1D is an enlarged perspective view of a portion of the boat assembly 18 showing FIG. 1B slide blocks 47 (with both assembled view of slide block 47L and an exploded view of slide block 47R) which are slidably mounted on the lower boat 43.

Figure 3A:
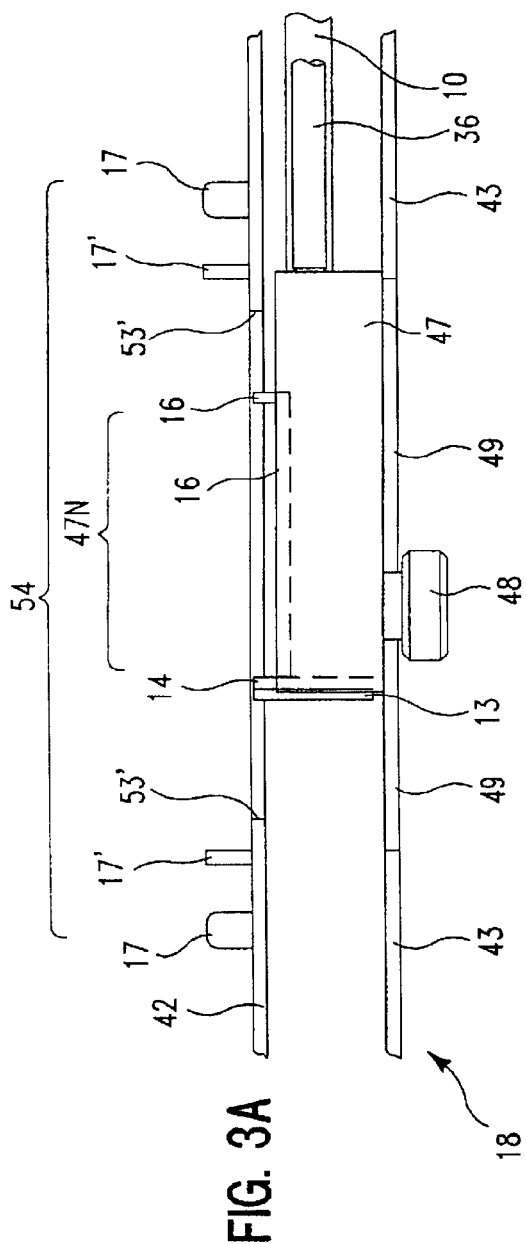
FIGS. 3A–3D show enlarged views of a portion of FIG. 2 showing the slide boat in various positions.
Figure 3B:
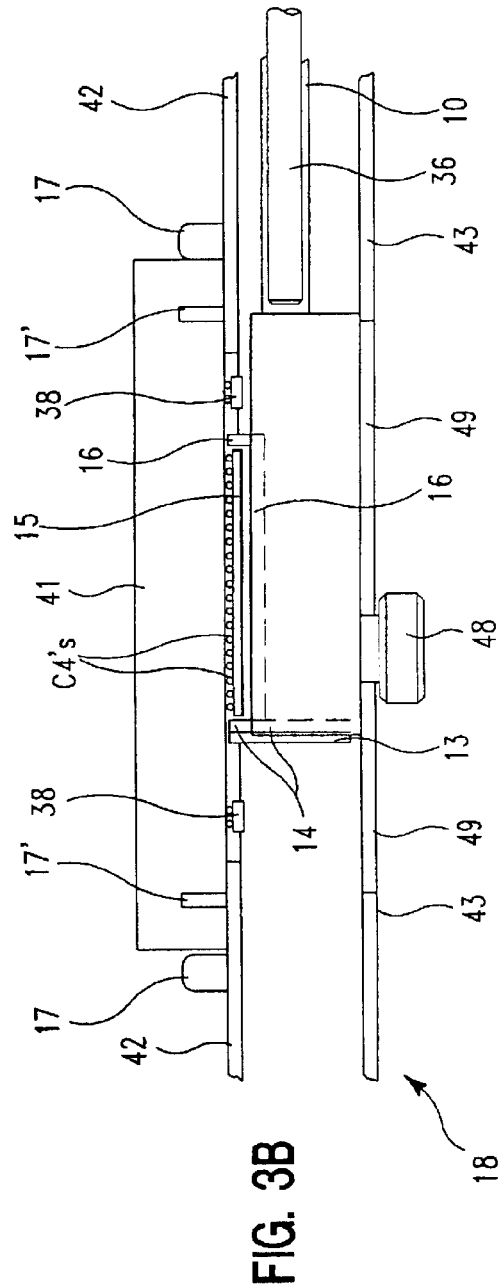
Figure 3C:
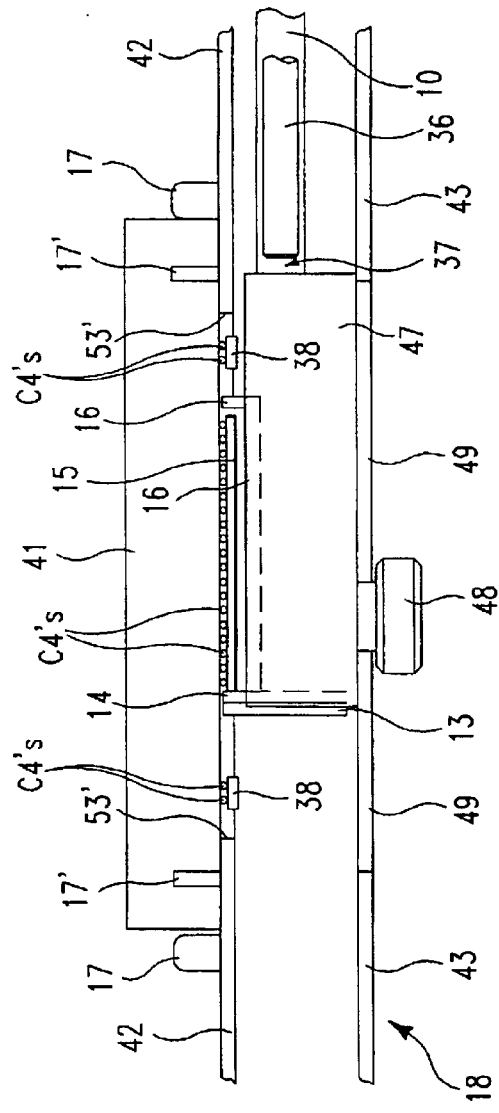

After some modifications, boats 42/43 have been specially assembled to support a substrate 41 carrying a chip 15 as shown in FIG. 2, as well as FIGS. 3B and 3C where they are shown enlarged. FIG. 2 shows a view of the right end of the boat assembly 18, which has been loaded with a substrate 41 carrying C4 solder joints which support a semiconductor chip 15 on its lower surface. FIGS. 3B and 3C are enlarged partial views of FIG. 2 with some modifications based upon the stage of the process involved with the method of this invention.

FIG. 1C is an enlarged perspective view of a portion of FIG. 1B which shows an enlarged portion of upper, framing boat 42 showing the seat 54 on the top surface of upper boat 42 with a window 53 in the center of the seat 54. The seat 54 is defined by four tabs 17 on the outer sides (with two tabs 17 on each side of the seat 54) of the upper boat 42 and four tabs 17' (with two tabs 17 on each end of the seat 54) along the length of the upper boat 42. The tabs 17/17', which are an integral part of the upper, framing boat 42, are located in positions which provide a snug fit for the substrate 41 when it is inserted onto the seat 54. The window 53 is provided so that a chip 15 can extend below the top surface of the upper boat 42. The bottom of surface surrounding the seat 54 of the upper boat 42 and the window 53 provide a frame around the lower surface of the substrate 41. The attached chip 15 extends through the window 53 in the center of that frame.

In FIG. 2, the substrate 41 is shown located in the seat 54 above the surface of the upper, framing boat 42, and the substrate 41 carries the semiconductor chip 15 secured to the bottom thereof by C4 solder ball joints, as is well understood by those skilled in the art. The substrate 41 is located in the seat 54 between a pair of end tabs 17 as well as being between the side tabs 17'.

At the stage of the manufacturing and testing process reached when the method and apparatus of the present invention are employed in a KGD process, the chips 15 have been tested in operation while temporarily bonded to the substrate 41 by C4 solder joints. The boat assembly 18 includes a coil spring load provided by a compressed coil spring 12 shown in FIGS. 1B and 2, which provides a return force that enables shearing the chip 15 away from the substrate 41 with a predetermined force. The amount of force to be applied upon blade 14 and chip 15 by compressed coil spring 12 is adjusted by turning a tension adjustment thumb nut 11 on compression screw 10 to tighten-increase compression or loosen-release compression of the coil spring 12. The left end of the compression screw 10 is securely fastened to slide block 47 and compression screw 10 applies a force on slide block 47 which is transferred through the plastic (Vespel) shearing blade 14 backed up by a metal shearing blade 13; since the plastic shearing blade 14 and the metal shearing blade are secured to the slide block 47. Thus, when the upper-right edge of shearing blade 14 is pulled to the right against the chip 15 while the substrate 41 is retained in position seated on upper boat 42 by the pair of tabs 17 on the right side of boat 42, as explained in detail below, the blade 14 transmits a shearing force to the chip 15 and its C4's. When the C4's are soft enough blade 14 will shear the chip 15 and the C4's away from the substrate 41, which is held in a fixed position in its seat 54.

Note that the configuration or scale of boats 42/43 is easily changed to accommodate various substrate carrier sizes and the coil spring load of the coil spring 12 is easily adjusted to accommodate various chip sizes by adjusting the compression adjusting thumb nut 11 on compression screw 10, thus offering a great deal of flexibility in application of the apparatus of this invention to use with various product designs.

FIG. 1A is a perspective view of the boat assembly 18 which includes five empty workpiece seats 54 along the length thereof, which are adapted to receive five substrates 41 carrying five chips 15.

It should be noted that while the embodiment shown in FIG. 1A includes five workpiece seats 54 and five substrates 41, that is simply one example of how one may employ the present invention. However, one seat and one substrate or many more or less than five seats and many more or less than five substrates may be employed in accordance with this invention as a matter of choice and economy of scale.

Figure 3D:
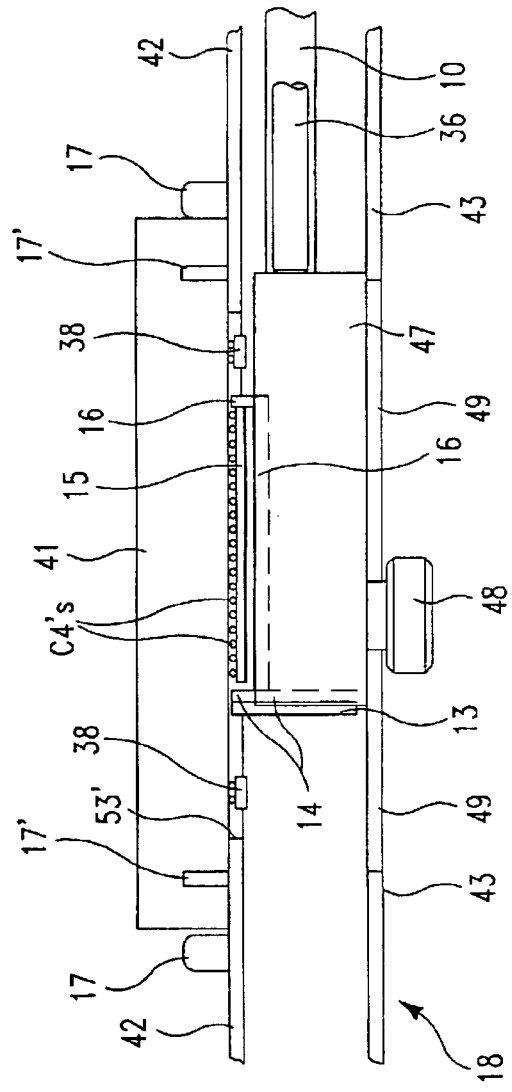

A side view of a single substrate 41, loaded with a single chip 15, is shown in FIG. 2, FIG. 3B and FIG. 3D. Before a substrate 41 and a chip 15 placed on a seat 54 on the boat assembly 18, the chip 15 has been tested successfully and is ready to be removed from the substrate 41 so that it can be assembled into a commercial product or the like. Referring again to FIG. 1A, the five substrate seats 54 are formed in the upper, framing boat 42. In addition, there are five empty slide blocks 47 supported by the lower support boat 42 (as shown in FIG. 2) visible through the empty windows 53 (shown in FIG. 1B) in upper framing boat 42. The slide blocks 47 in FIG. 1A are located below the empty windows 53, and they are shown centered below the seats 54. Thus, the slide blocks 47 are framed by the windows 53. The periphery of each of the windows 53 surrounds a slide blocks 47. As can be seen in FIG. 2, the slide block 47 is located below the top surface of upper, framing boat 42 slidably secured to the lower, support boat 43 by a shoulder screw 48. The shoulder screw 48 slides back and forth in a transverse travel-guide slot 49 in the top surface of the lower boat 43. That is to say that each slot 49 extends partially across the top surface of the lower boat 43 permitting the corresponding slide block 47 to slide transversely (from right-to-left or from left-to-right as shown in FIG. 2. and FIGS. 3A–3D).

FIG. 2 is a right side view of the boat assembly 18 of FIG. 1A, which shows a substrate 41 carrying a semiconductor chip 15 loaded into the seat 54 at the right hand end of the assembly 18 as it is seen in FIG. 1A. The chip 15 is ready to be stripped from substrate 41 by the shearing action of the blade 14 in boat assembly 18 when the loaded fixture is located in an oven heated to a predetermined temperature at which the C4 solder joints which provided bonds between the substrate 41 and the chip 15 soften and release the chip 15 into a nest 47N formed by a nest element 16 and the upper end of plastic shearing blade 14 on the top surface of the slide block 47.

Referring to FIG. 1D, a perspective view of a pair of slide blocks 47 located on the lower boat 43 is shown. The slide block 47R to the right is shown in an exploded view and the slide block 47L on the left is shown in an assembled view. Each set of the plastic shearing blades 14 and the metal shearing blades 13 is secured by screws in a slot 14' on the left side of the slide blocks 47L and 47R, as best illustrated by the exploded view of right slide block 47R in FIG. 1D. Each of the nest elements 16 is secured by screws in a central slot 40 on the top surface of the slide blocks 47L/47R between the dual tops 47T of slide blocks 47L/47R on either side of the central slot 40. The assembled blade and nest parts 13/14/16 in the slide block 47L show the nest 47N on the top surface thereof between the top surfaces 47T of the left slide block 47L. The purpose of the nest 47N can be seen by referring to FIG. 3D, where the chip 15, which has been sheared away from the substrate 41 by blade 14, is resting in the nest 47N on top of the nest element 16.

Referring again to FIG. 1A, the largest elements of the boat assembly 18 comprise a pair of stainless steel sheet metal boats including upper, framing boat 42 and lower support boat 43 (known as Auer boats manufactured and sold by Auer Precision Co., Inc. which is located in Mesa, Ariz.) which are assembled together by stand-offs 44 and screws 45 connected by using common tooling holes 21 that are punched into the top surface of the upper boat 42, and common tooling holes 46 that are punched into the top surface of the lower boat 43 during the cycle of manufacturing thereof. Boat 42 and boat 43, if they are Auer boats, are employed as industry standard process carriers that are typically used in manufacturing of electronic substrate devices. Referring to FIGS. 1A, 3A and 3B, there are shown five substrate seats 54 for five substrates 41 along the length of upper, framing boat 42. There are five framing windows 53 through the surface of the upper, framing boat 42 centered inside of each substrate seat 54. Each window 53 in FIG. 1A reveals one of the five slide blocks 47 below the corresponding substrate seat 54. Each slide block 47 is slidably attached to the lower boat 43 by a shoulder screw 48 which extends through a corresponding long slot 49 provided along the length of the lower boat 43. An example of how a slide block 47 is secured to lower boat 43 is shown in FIG. 2.

Operation of Slide Block

Each of the slide blocks 47 is adapted for supporting a polyimide (Vespel brand), plastic shearing blade 14 which is adapted to shear a chip 15 away from its substrate 41. Each of the slide blocks 47 also provides a nest 47N formed by a nest element 16 and a shearing blade 14 into which a chip 15 falls when it is sheared away from the substrate 41 retained in its position in the seat 54 on the upper, framing boat 42 by the four pairs of tabs 17, 17'.

Referring to FIGS. 2, and 3A–3D, as explained in part, above, a slide block 47 is shown secured to the lower boat 43 by means of one of a set of shoulder screws 48 and travel-guide slots 49 in boat 43. Each shoulder screw 48 extends through a corresponding travel-guide slot 49. The shoulder screw 48 is screwed all the way into a threaded hole in the bottom of a corresponding slide block 47 until it is seated to affix the screw 48 to the block 47. As shown the shoulder screw 48 when seated leaves space permitting mechanical play between the slide block 47 and the surface of the boat 43. That mechanical play permits the slide block 47 and the shoulder screw 48 to be free to slide from left-to-right and from right-to-left in FIGS. 2 and 3A–3D. The slot 49 guides the motion of the slide block 47 relative to the boat 43. That is to say that the slide block 47 is free to slide within the lateral limits defined by the slot 49 with the guidance provided by both the body and the head of the shoulder screw 48.

Operation of Compression Screw

As shown in FIG. 2 the compression screw 10 is combined with a tension adjustment thumb nut 11 and a compression coil spring 12 and then inserted through a lateral surface construction hole 21 (see FIG. 1) located in the side of the upper boat 42 and attached to slide block 47. The screw is threaded in part and has a smooth shank in part. The threads remain where the tension-adjustment-thumb nut 11 is located, near the head of the compression screw 10 and at the right end of compression coil spring 12. The threads on screw 10 also remain at the left end of compression screw 10, which is threadedly affixed and secured to the slide block 47. However, between the nut 11 and the slide block 47, the threads have been removed from the compression screw 10 to avoid any mechanical interference where the shank of screw 10 travels back and forth through the hole 21 in the side of the upper boat 42. The thumb nut 11 can be turned in and out on compression screw 10, to adjust the linear tension force to the right applied by compression coil spring 12 upon the compression screw 10, and thus upon the shearing blades 13 and 14.

Adjustable Stops

Referring to FIG. 2, a threaded rod comprising an adjustable stop 36 is shown which passes through another one of the lateral surface construction holes 21 in the upper boat 42. The adjustable stop 36 is provided to prevent the slide block 47 from traveling too far to the right when the chip 15 is released from the substrate 41. The reason that adjustable stop 36 is required is that there are capacitors 38 extending down below the substrate 41 which could be damaged by excessive travel to the right of the upward extending foot on the right end of the nest element 16. The adjustable stop 36 is held in position by a threaded nut 50 on the right side of the sidewall of the upper boat 42 and a self-clinching slide-type nut 52 (such as a nut manufactured by PEM Fastening Systems, a PennEngineering Company) on the left side of the same boat sidewall 42.

Shearing Operation Steps

FIG. 3A, shows an enlarged view of a portion of the boat assembly 18 seen in FIG. 2. Among other elements, the compression screw 10 is truncated, but the device is shown in the home position, before the time that the compression screw 10 is to be pushed to the left to put the shearing blades 13 and 14 far enough to the left to provide clearance for loading, i.e. placing, of a chip 15 and its substrate 41 onto the seat 54. The nest 47N is seen between the foot of nest element 16 and the plastic shearing blade 14. The seat 54 is shown between the outboard tabs 17 near the sides of the boat 42. It can be seen that the slide block 47 is in contact with the stop 36 which prevents the compression coil spring 12 from pulling the slide block 47 any farther to the right. As stated above, this view shows the substantial clearance between the surface of the lower boat 43 and the head of the shoulder screw 48 that allows the slide block 47 to slide freely to the left or to the right on the top surface of the lower boat 43.

FIG. 3B shows the boat assembly 18 of FIG. 3A after the compression screw 10 has been driven far enough to the left so that the shearing blade 14 is moved to provide enough clearance space for loading the chip 15 when the substrate 31 is loaded onto the seat 54 on the fixture 18. Note that chip 15, which it is attached to the substrate 41 by C4's, is located in a space below the substrate 41 to the right of the shearing blade 14 which would otherwise interfere with the chip 15 if blade 14 were farther to the right. In FIG. 3B, it can be seen that there is a slight clearance between the chip 15 and shearing blade 14 and that the chip 15 fits between the foot of nest element 16 and shearing blade 14.

FIG. 3C shows the boat assembly 18 of FIG. 3B after the compression screw 10 has been released from external pressure thereon to return the slide block 47 and blade 14 to a position farther to the right in response to the bias force applied by the coil spring 33. The top edge of the shearing blade 14 is shown to be overlapping and in contact with the edge of chip 15. Moreover, because of the small movement of the claim 19 and the blade 14, the space between the foot of nest element 16 and the right edge of chip 15 is larger than it was in FIG. 3B. When all of five of the shearing blades 14 are in contact with the edges of all five of the chips 15 on the fixture 18, then the fixture 18 and its load of substrates 41 is ready to be placed into an oven to raise the temperature to a high enough temperature to soften the C4 solder balls and at such temperatures, the shear force being exerted by shearing blade 14 is sufficient to release the C4 solder balls and the chip 15 from the substrate 41 causing the chip 15 it to fall down from the bottom of the substrate 41.

FIG. 3D shows the shearing blade 14 of FIG. 3C after the chip 15 has fallen into the nest 47N provided by the nest element 16 and the shearing blade 14, as result of the heating and shear force applied by shearing blade 14 described above. Note that the slide block 47 has returned to its home position in contact with the end of the adjustable stop 36.

As stated above, referring to FIG. 2, the nest element 16 which is also made from polyimide (Vespel brand) and which is attached to the top side of the slide block 47 has a foot which when combined with the blade 14 are located in positions on the left and the right of the chip which allow for slight gaps around the chip 15 prior to a shearing operation.

The plastic shearing blade 14, which is made from Vespel brand polyimide or the equivalent, is backed up with a metal backup shearing blade 13. A metal backup shearing blade 13 and a plastic shearing blade 14 are attached to the distal end of each slide block 47 (farthest from compression coil spring 12) with screws into the left end of block 47 in FIG. 2, not shown. The plastic shearing blade 14 is positioned on each slide block 47 so that one edge is approximately 0.01 cm (0.005 inches) below the chip side surface of the substrate 41 during the shearing operation.

The polyimide shearing blade 14 acts as a cushion to the chip 15 when forces are applied during chip shear and the polyimide nest 47N cushions and catches the chip during the "flinging" action that takes place during the shear operation. Although other plastic materials may suit this application, Vespel brand polyimide is currently used for the high temperature characteristics thereof.

The lateral surface construction hole 21 in upper, framing boat 42 is large enough to allow a slip fit for the compression screw 10 and small enough to act as a back stop to the compression coil spring 12.

This arrangement allows for each slide block 47 to be pushed forward with the compression screw 10 and retracted with its separate compression coil spring 12.

Figure 4:
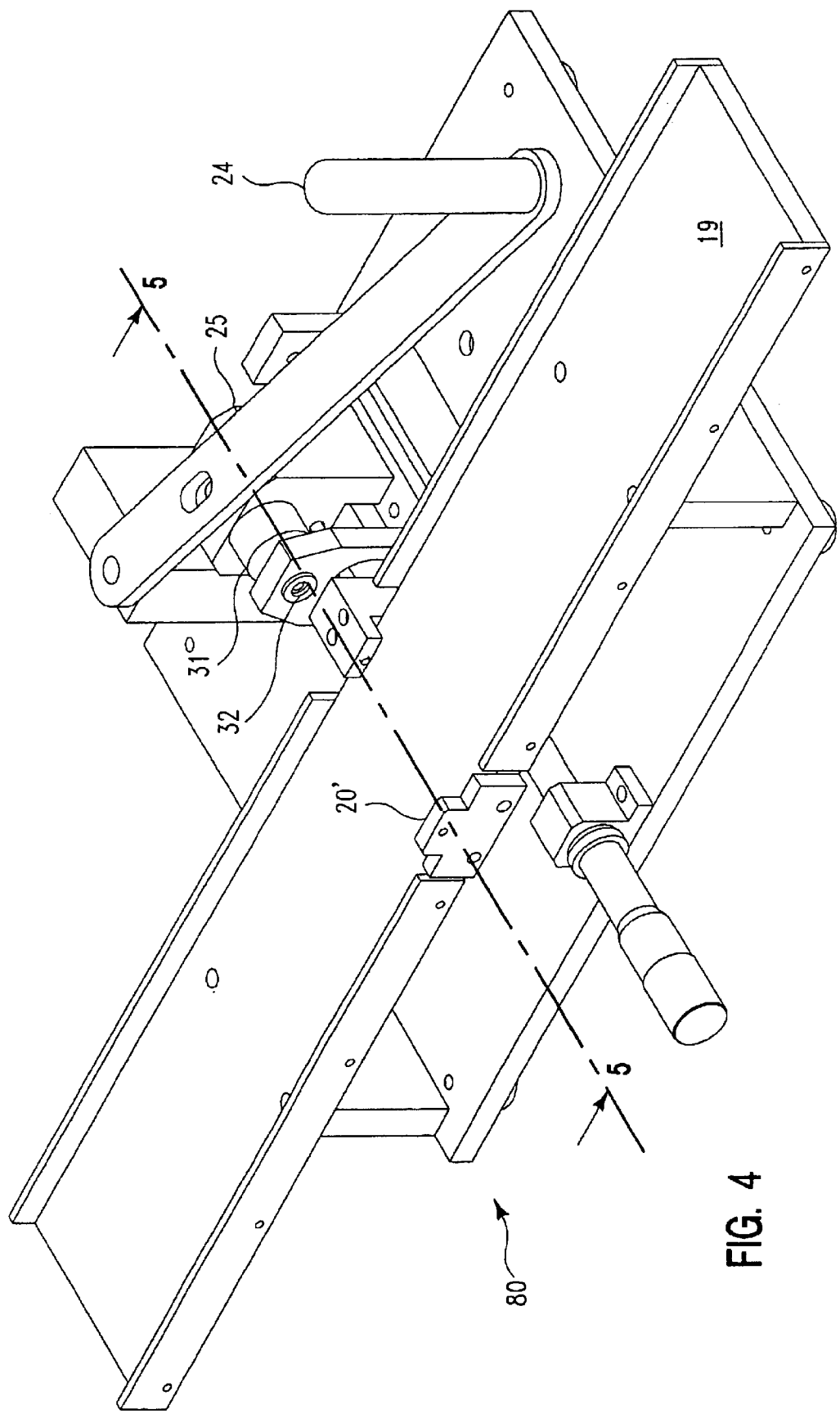
FIG. 4 is a perspective view of an tool employed during arming of the shearing blade and slide block by driving a screw which pushes the slide block to the left permitting insertion of the substrates with chips into the seats on an assembly and arming the shearing blade.

FIG. 4 is a perspective view of a tool 80 employed during arming of the shearing blade 15 by driving of the slide block 47 to the left and insertion of the substrates 41 with chips 15 into the seats 54 on an boat assembly 18. The tool 80, which is used to compress coil spring 12, drives the slide block 47 into a position that allows the next substrate 41 with its chip 15 to be loaded into the seat 54 as indicated in FIG. 3B. After a substrate 41 and its chip 15 have been loaded, the boat assembly 18 is moved in a sequential process along to the next position on table 19 for each of the five positions where seats 54 are located, one at a time, along the length of the boat assembly 18. At each seat position, a substrate 41 is loaded into the corresponding seat 54 and the chip 15 is placed under tension from the corresponding shearing blade 14 and compression coil spring 12, as described above. The sequence of substrate 41 and chip 15 installation continues until all five of the substrates 41 with chips 15 at the five seat positions have been loaded onto their seats 54.

Figure 5:
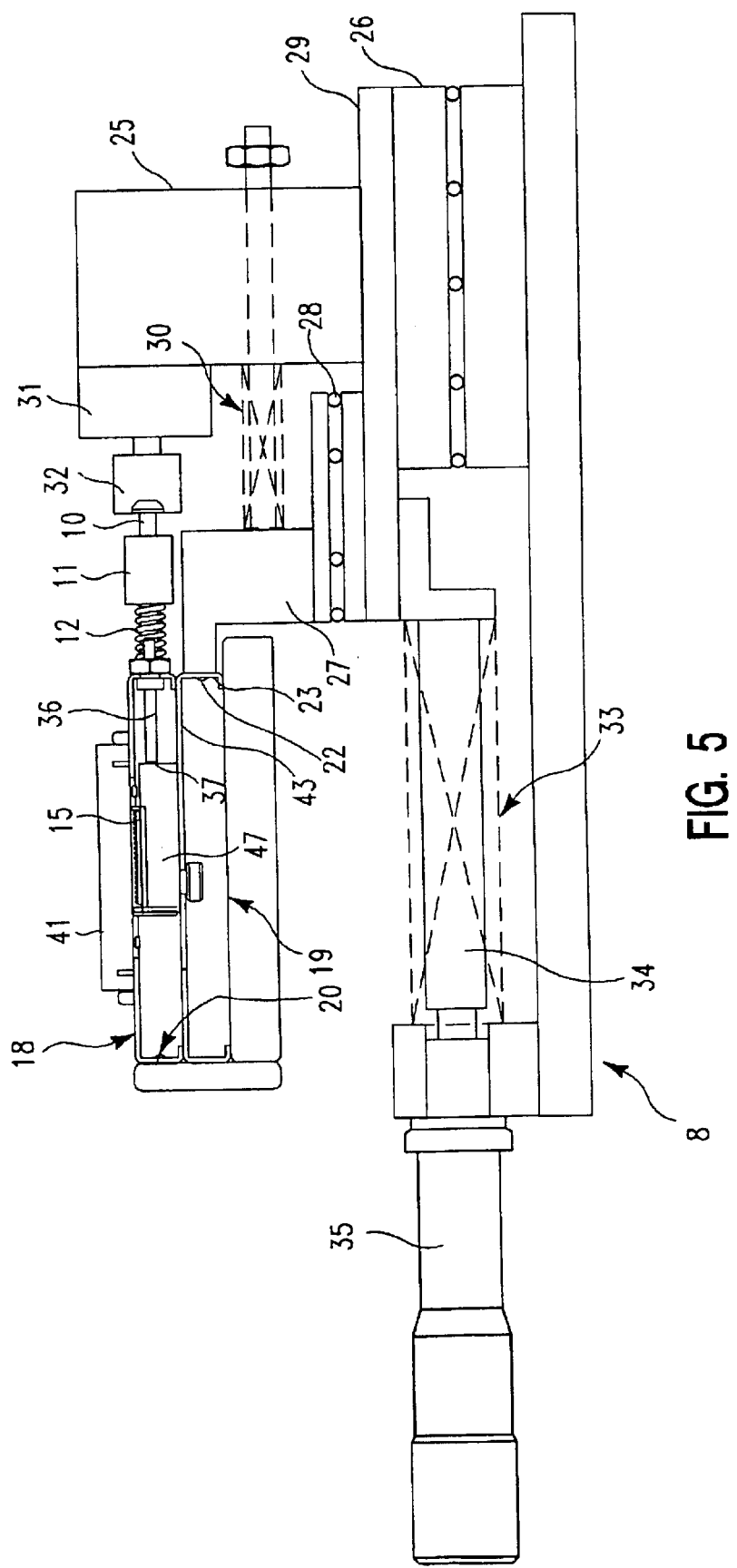
FIG. 5 is a cross section of this device taken along line 5–5' in FIG. 4 with the boat assembly in the armed and loaded position.

FIG. 5 is a cross section of this device taken along line 5–5' in FIG. 4 with the boat assembly 18 in the armed and loaded position.

The boat assembly 18 and other devices employed in accordance with this invention operate as follows.

Sequence of Operation

The operator places an empty boat assembly 18 on a load table 19 and locates it such that a pin 20 engages the upper boat 42 by insertion into one of the tooling holes 21 in the upper boat 42, that is determined by loading position of the boat assembly 18. A hold down pin 22 is inserted into a tooling hole 46 located in the lower boat 43. A load cell 31 with a centering tip 32 is attached to a pressure block 25 and is positioned so that the centering tip 32 is aligned with the compression screw 10. Pressure block 25 is supported on a common plate 29 which is supported upon a slidable support 26.

Applying Loading Stroke for Loading/Putting Substrate onto Upper Boat

Referring to FIG. 4, then the operator pulls a handle 24 forward which drives pressure block 25 to the left as can be seen in FIG. 5. The pressure block 25 is guided by the slidable support 26, towards the compression screw 10. A hold-down block 27 is mounted to a second slidable support 28 which is attached to a common plate 29 shared by the pressure block 25 and slide 26. The hold down block 27 is driven forward by a another compression coil spring 30 and it is designed to engage the lower boat 43 before centering tip 32 engages the compression screw 10. As the operator continues to pull the handle 24 forward, hold down block 27 with pin 22 engages the lower boat 43 and a loading stroke comprising a substantial force is applied by the coil spring 30. The centering tip 32 then makes contact to the compression screw 10 resulting in compression of the coil spring 12. The end of the loading stroke is completed when a stop pin 34, which is attached to common plate 29, contacts the micrometer stop 35. This locates the slide block 47 in a position that allows substrate 41 with its chip 15 to be located in the shear position as indicated in FIG. 3B and as described above. Once the substrate 41 and chip 15 are in the shear position as shown in FIG. 3B, the operator releases the handle 24 and the pressure block 25 and hold down block 27 are brought back to the home position by coil spring 33. The plastic shearing blade 14 is now putting a shearing force onto the chip 15 and a controlled tension is being applied by the coil spring 12, thus completing the load cycle for one of the five positions of device 18 as indicated in FIG. 3C.

Adjustable stops 36 attached to the upper boat 42 are adjusted to allow a gap 37 of approximately 0.11 cm (0.03 inches) between the stops 36 and slide block 47. This limits the shear stroke and prevents the capacitors 38 located around the perimeter of the chip 15 from being knocked off by the foot of the nest element 16 during the shear operation. The amount of force being applied to the chip 15 by coil spring 12 is a very important aspect of this invention. Too much force can cause damage to the bottom layer metallurgy of the chip 15 and too little force will not shear the C4's of chip 15 thereby failing to remove it from the substrate 41. Therefore, a tight process window, in terms of grams of force per C4 solder connection, is required. To monitor this, the load cell 31 connected to a electronic force measuring system measures the force during each product load cycle. To adjust the ultimate shear force on the C4's bonded to the chip 15, the tension adjustment, thumb nut 11 (seen in FIG. 2) is threaded to the compression screw 10. Turning of the thumb nut 11 changes the tension provided by blade 14 by applying more or less compression to the coil spring 12. This tension adjustment in conjunction with micrometer stop 35 allows for various chip sizes with varied numbers of C4 junctions to be sheared.

Advantages of the Invention

The present device and method of the invention are effective for chip removal from a substrate; and they provide a pre-load mechanism for removing known good dies from substrate carriers.

In addition costs are minimized by low tooling cost due to minimal machining during fabrication and by the flexibility of the apparatus and the process which permits adapting the tool to operate with product variations is achieved with minimal cost.

In addition this invention provides process consistency with uniform shear forces applied to each chip at room temperature.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by Letters Patent is as follows:

1. A method for separating a semiconductor device from a substrate in a fixture having a shearing element where the semiconductor device is attached to the substrate by solder connections to form an assembly, the method comprising:
   applying a loading force to drive the shearing element away from its home position to which it is urged by an adjustable mechanical biasing force into a loading position,
   loading the assembly of the substrate and the semiconductor device into the fixture with the shearing element proximate to the semiconductor device,
   removing the loading force to apply a shearing force derived from the adjustable mechanical biasing force and applied by the shearing element to the semiconductor device, and
   heating the solder connections of the assembly in the fixture to a predetermined temperature.

2. The method of claim 1 with the fixture including a top member with a window therethrough for the semiconductor device and the shearing element located below the top member.

3. The method of claim 1 wherein the shearing element comprises a slidable blade.

4. The method of claim 1 wherein the shearing element is a blade affixed to a slidable element that is connected by a linkage to a coil spring which applies the mechanical biasing force thereto.

5. The method of claim 1 wherein the predetermined temperature is below the melting temperature of the solder at which shearing of the solder connections occurs.

6. The method of claim 1 wherein:
   the fixture includes a top member with a window therethrough for the semiconductor device and the shearing element located below the top member,
   the shearing element comprises a slidable blade,
   the slidable blade is affixed to a slidable element that is connected by a linkage to a coil spring which applies the mechanical biasing force thereto,
   when the loading force is removed the slidable blade moves from proximate to the chip into contact with the chip thereby applying a shearing force to the chip in response to the biasing force from the coil spring, and
   the predetermined temperature at which shearing of the solder connections occurs in response to the shearing force is below the melting temperature of the solder.

7. A method for removing a circuit chip from a substrate in a fixture having a shearing element where the chip is secured to a substrate by bonding elements, comprising:
   applying a loading force to move the shearing element from a mechanically biased home position into a loading position against an adjustable biasing force,
   then loading the substrate with the chip onto the fixture,
   removing the loading force to arm the shearing element into a position in contact with the chip, so the adjustable biasing force is applied by the shearing element to the semiconductor device, and
   heating the assembly located in the fixture to a predetermined temperature until shearing of the bonding elements occurs while continuously applying the mechanical force with the shearing element.

8. The method of claim 7 wherein the shearing element comprises a slidable blade.

9. The method of claim 7 wherein the shearing element is a blade affixed to a slidable element that is connected by a linkage to a coil spring that applies the biasing force thereto.

10. The method of claim 7 wherein the shearing element is a blade affixed to a slidable block that is biased to a home position by a coil spring which applies the biasing force thereto.

11. The method of claim 7 wherein:
   the shearing element is a blade affixed to a slidable block which is connected by a screw that is biased to a home position by a coil spring which applies the biasing force thereto, and
   an adjustable element is provided for adjusting the bias applied by the coil spring.

12. The method of claim 7 wherein the bonding elements comprise solder and the step is performed of heating the solder to a temperature facilitating shear and removal of the chips from the substrate while the solder is in a solid state.

13. The method of claim 7 wherein the substrate is loaded into a seat in an upper element with the chip extending through a window therein.

14. The method of claim 7 wherein:
   the substrate is loaded into a seat in an upper element of the fixture with the chip extending through a window therein, the shearing element is connected to a slide element that is biased to a home position by a coil spring which applies the biasing force thereto, and an adjustable element is provided for adjusting the bias applied by the coil spring.

15. The method of claim 14 wherein the slide element includes a nest located below the window adapted and located for catching a chip sheared from a substrate.

16. Apparatus for separating at least one semiconductor device from at least one substrate where the at least one semiconductor device is attached to the at least one substrate by solder connections to form an assembly, comprising:

a biasing element for applying a loading force to drive a shearing element away from its home position to which it is urged by an adjustable mechanical biasing element into a loading position under a fixture, a loading element for placing the assembly of the substrate and the semiconductor device into a fixture with a window therethrough for the semiconductor device with the shearing element in contact with the semiconductor device and armed for shearing the semiconductor device from the substrate.

17. The apparatus of claim 16 wherein the shearing element comprises a slidable blade.

18. The apparatus of claim 16 wherein the shearing element is a blade affixed to a slidable element that is connected by a linkage to a coil spring which applies the biasing force thereto.

19. Apparatus for removing a circuit chip from a substrate where the chip is secured to a substrate by bonding elements, comprising:

a biasing element for applying a loading force to move a shearing element from a mechanically biased home position into a loading position under a fixture against an adjustable biasing force, a loading element for placing the substrate with the chip onto the fixture, and a retaining element for holding the shearing element in a position in contact with the chip, so the biasing force is applied by the shearing element to the semiconductor device.

20. The apparatus of claim 19 wherein the shearing element comprises a slidable blade.

21. The apparatus of claim 19 wherein the shearing element is a blade affixed to a slidable element that is connected by a linkage to a coil spring that applies the biasing force thereto.

22. The apparatus of claim 19 wherein the shearing element is a blade affixed to a slidable block which is connected by a screw that is biased to a home position by a coil spring which applies the biasing force thereto.

23. The apparatus of claim 19 wherein:

the shearing element is a blade affixed to a slidable block that is connected by a screw that is biased to a home position by a coil spring which applies the biasing force thereto, and an adjustable element is provided for adjusting the bias applied by the coil spring.

24. The apparatus of claim 19 wherein the bonding elements comprise solder adapted to be heated to a temperature facilitating shear and removal of the chips from the substrate while the solder is in a solid state.

25. The apparatus of claim 19 wherein the substrate is loaded into a seat in an upper element with the chip extending through a window therein.

26. The apparatus of claim 19 wherein:

the substrate is loaded into a seat in an upper element with the chip extending through a window therein, the shearing element is connected to a slide element which is connected by a screw that is biased to a home position by a coil spring which applies the biasing force thereto, and an adjustable element is provided for adjusting the bias applied by the coil spring.

27. The apparatus of claim 24 wherein the slide element includes a nest located below the window adapted and located in a position for catching a chip sheared from a substrate.

28. The method of claim 1 further comprising the step between applying a loading force and removing the loading force of adjusting the adjustable mechanical biasing force to a predetermined biasing force.

29. The method of claim 7 further comprising the step between applying a loading force and removing the loading force of adjusting the adjustable biasing force to a predetermined biasing force.

30. The apparatus of claim 16 wherein the adjustable mechanical biasing element comprises a coil spring and further comprising an adjustable element for adjusting the bias applied by the coil spring.

31. The apparatus of claim 16 wherein the apparatus is for separating a plurality of semiconductor devices from a plurality of substrates and further comprising:

additional adjustable mechanical biasing elements, shearing elements and windows for separating a semiconductor device from each of a plurality of substrates wherein there is a one to one correspondence between adjustable mechanical biasing elements, shearing elements and windows and wherein each adjustable mechanical biasing element is adjusted according to each semiconductor device to be sheared from each substrate.

32. Apparatus for separating a semiconductor device from each of a plurality of assemblies comprising a semiconductor device and a substrate, the apparatus comprising:

a fixture having (i) a plurality of windows in side-by-side relation, each of said windows adapted to receive an assembly with the semiconductor device facing downwardly, (ii) a plurality of adjustable biasing elements, and (iii) a plurality of shearing elements connected to the plurality of adjustable biasing elements for separating the semiconductor device from the substrate, wherein said windows, adjustable biasing elements and shearing elements are associated with one another in a one to one correspondence; and a loading apparatus for applying a loading force to move a shearing element from a biased home position into a loading position against an adjustable biasing force from the adjustable biasing element;

wherein, in operation, the loading apparatus is actuated to move a shearing element from the home position into the loading position, an assembly is placed semiconductor device down into a window and the loading apparatus is deactuated so that the adjustable biasing element moves the shearing element to its home position where it exerts a biasing force against the semiconductor device; and the foregoing operation is repeated a predetermined number of times corresponding to the number of assemblies to be placed in the windows.

* * * * *